United States Patent [19]

Ono

[11] 4,093,984
[45] June 6, 1978

[54] DATA PROCESSING SYSTEM HAVING A CYCLE CONTROL FUNCTION

[75] Inventor: Masahiko Ono, Tokyo, Japan

[73] Assignee: Tokyo Shibaura Electric Co., Ltd., Kawasaki, Japan

[21] Appl. No.: 728,204

[22] Filed: Sep. 30, 1976

[30] Foreign Application Priority Data

Sep. 30, 1975 Japan .................................. 50-117906

[51] Int. Cl.² .............................................. G06F 1/04
[52] U.S. Cl. .................................................. 364/200
[58] Field of Search ... 364/200 MS File, 900 MS File

[56] References Cited

U.S. PATENT DOCUMENTS 3,766,532  10/1973  Liebel, Jr. .......................... 340/172.5
3,962,683  6/1976   Brown et al. ....................... 340/172.5

Primary Examiner—Raulfe B. Zache
Attorney, Agent, or Firm—Oblon, Fisher, Spivak, McClelland & Maier

[57] ABSTRACT

A data processing system comprises a serially addressed register file, an operation circuit and an instruction-stored Read Only Memory (ROM). Each machine cycle of the system is divided into two partial cycles, and during one of the partial cycles the operation processing is carried out in accordance with the content of a functional register positioned in the register file, and during the other of the partial cycles the operation processing is executed in accordance with the instructions read out from the ROM. The content of the functional register is changed in the same manner as in the other registers in the register file.

3 Claims, 9 Drawing Figures

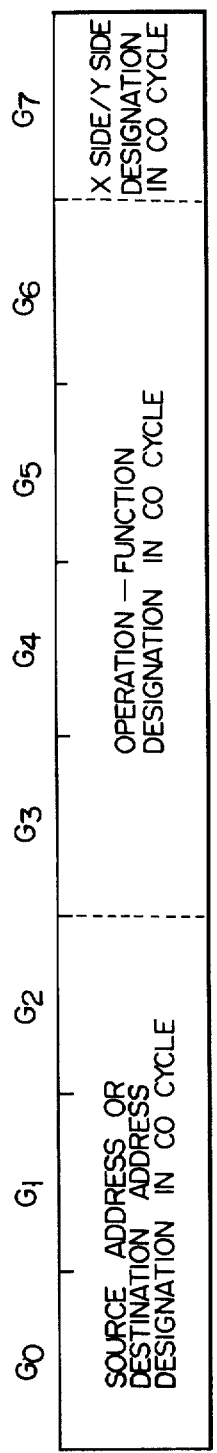
FIG. 5
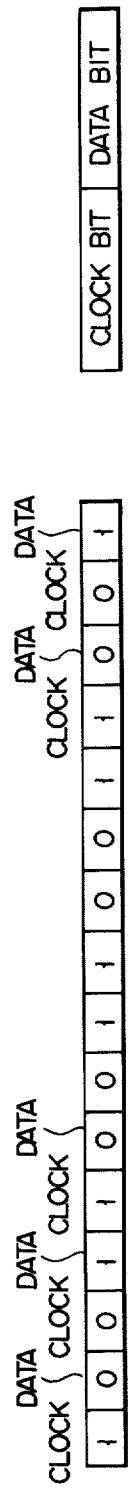
FIG. 7A
FIG. 7B
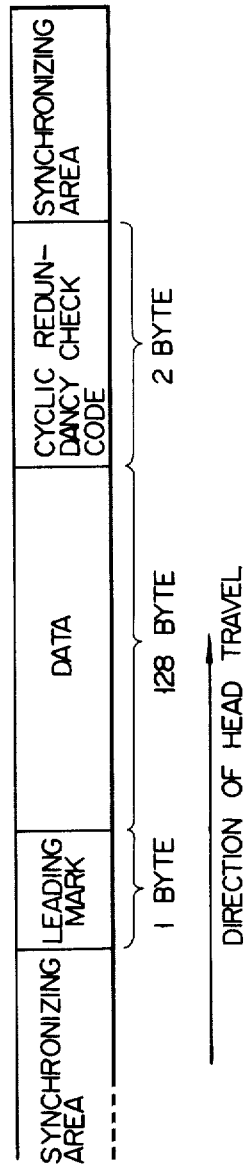
FIG. 7C

DATA PROCESSING SYSTEM HAVING A CYCLE CONTROL FUNCTION

BACKGROUND OF THE INVENTION

This invention relates to a data processing system, and more particularly to a data processing system which is constructed, by using no private circuits group but using low-speed logical circuit elements, into a structure suitable for conversion into an integrated circuit, thereby to effect the data transfer between a high-speed input/output unit and a central processing unit (CPU), or to effect various types of data processings at high speed.

Generally, demanded of a data processor are the functions including the "serial" to "parallel" conversion, buffering, and error check (cyclic redundancy check), of input/output data, the detection on judgement of the peculiar marks (discrimination Nos.) labellled to input/output data format, the generation or production thereof, the data link between the system and the CPU, etc.

In order to achieve these functions, a conventional data processor is formed into two types of hardware structure, one of which is a random logic type provided with a private-circuits group for executing the above-mentioned functions, and the other of which is a matrix type provided with a general-circuits group for performing the above-mentioned functions. In the case of the random logic type, a private circuit is exclusively used for each function. The hardware structure of the random logic type is not effective to convert into an integrated circuit but, even if the operation processing speed is low, it will not cause any inconvenience to such a data processor. In the case of the matrix type, the data processor is formed mainly of a working-registers group, a Read Only Memory (ROM) and a Random Access Memory (RAM), and its operation is executed in accordance with the instructions read out from the ROM for each prescribed machine cycle. Here "machine cycle" means the intervals at which the instructions are read out from the ROM one after another. Thus, during the machine cycle each instruction from the ROM is executed. Usually, each instruction is executed within a time shorter than the machine cycle, and no instruction is executed during a portion of the machine cycle. In this case, the circuits in the processor are arranged in the form of a matrix and therefore easy to convert into an integrated circuit. Since, however, each of them is generally used, the processor should carry out its operation processing at high speed. In the case of the matrix type, however, it is necessary, for this purpose, to provide a private-circuits group (increase the random characteristics). Further, upon integration of this matrix type data-processor on one chip, the following problem will arise.

Namely, in the case where a higher level of an operation functions are incorporated, they should be so done with high density. Simultaneously, in the case where they are realized with the Large Scaled Integration, an integrated circuit technique for use in a MOS (Metal Oxide Semiconductor transistor) structure has to be used. The processing speed of the MOS transistor circuit, however, is generally lower, to an extent of one or two digits, than that of a bipolar transistor circuit. Accordingly, in order to convert the matrix type processor into an integrated circuit by the use of the MOS structure and permit it to carry out the high speed processing operation, consideration must be given to a circuit architecture of the processor.

It is considered that this architecture includes the following two methods.

(a) A method of using a private-circuits group

The existing MOS/LSI technique enables a MOS/LSI circuit to be driven at a frequency of about 2MHz at maximum. For example, in the case where control is made of a magnetic disk unit having an average transfer speed of 250k bit/sec (200K bit/sec at minimum, 333 K bit/sec at maximum), the data processing can be sufficiently effected if a private circuit is provided for each of various functions demanded of the data processor. However, one-bit cell of transfer data is usually represented by two-bit information coming out in series on the time axis. Actually, therefore, the said private circuit is required to cope with the data processing speed twice the above-mentioned transfer speed. From the standpoint of integrated circuit design, however, the provision of a private-circuits group causes a remarkable decrease in integration efficiency, and particularly causes production of a drawback that the architecture of the processor fails to have general availability.

(b) A method of using a general-circuits group to increase the data processing speed of the processor In order to use an operation unit, a working-register group and an instruction storage for plural purposes, the processor is constructd into a hardware structure in which they are incorporated arranged to serve such plurality of use purposes, and is designed to prevent, as much as possible, the general-circuit from having random characteristics, and thus is formed into a matrix type logical circuit structure. According to this method, there can be obtained the following two advantages.

(1) Although the matrix type logical circuit structure unavoidably has a logical redundancy, it can provide a higher degree of integration than a random logical circuit structure by properly designing instruction words or program instructions themselves. (2) The resulting processor can have the wide-available architecture.

The above-mentioned method (b) is advantageous as compared with the above-mentioned method (a), but has a drawback in terms of processing speed. This drawback arises from the fact that the cycle time is limited. That is to say, this storage has as considerably large a capacity as usually 4K to 8K bits. In order to increase the processing speed of the data processor, therefore, the minimum length of cycle time of the storage should be made small. But the decrease in this minimum length of cycle time is followed by the arising of the necessity to increase driving capabilities of the word driver for the storage. This means an increase in the occupied area of the storage including the drivers, resulting in an increase in terms of integration scale.

SUMMARY OF THE INVENTION

The object of the invention is to provide a data processing system of the hardware structure which makes it substantially unnecessary for the circuit involved to have random characteristics, and mitigates the llimitation inposed upon the data processing speed and is suitable to conversion into an integrated circuit based on the use of low-speed logical circuit elements.

For attaining the above object, the data processing system of the invention comprises a consecutively addressed, register file an instruction storage for storing instructions therein, an operation circuit for subjecting the data to operation in accordance with the instruction, and at least one functional register addressed in the register file, wherein the single machine cycle is divided into at least two partial cycles; during one of the partial cycles the operation processing is performed in accordance with a content of the functional register addressed in the register file; and during the other of the partial cycles the operation processing is executed in accordance with the instructions read out from the instruction storage.

Further, the above-mentioned functional register can designate not only the address of the register file during said one of the two partial cycles but also the function of the operation circuit such as the functions of logical operation, or arithmetic operation. Therefore, the system is permitted to have various functions including a shift-register function, a cyclic redundancy check function, or the like, and a a result has an architecture increased in its wide-availability.

Further, since each machine cycle of the system is divided into at least two partial cycles, the data processing speed can be increased with the result that the system becomes suitable for conversion into an integrated circuit based on the use of low-speed logical circuit elements such as MOS elements. In this invention, the data processing system is formed on a single LSI chip.

BRIEF DESCRIPTION OF THE DRAWING

FIG. 5 shows a format of the functional register (G register) shown in FIG. 1;

FIGS. 7(A), 7(B) and 7(C) are a virtual-written format of a magnetic disk used to explain the flow chart of FIG. 6, FIG. 7(A) showing the composition of a single bit-cell, FIG. 7(B) showing the composition of a leading mark, FIG. 7(C) showing the composition of the data block written in the disk.

DETAILED DESCRIPTION OF THE PREFERRED EMBODIMENTS

Figure 1:
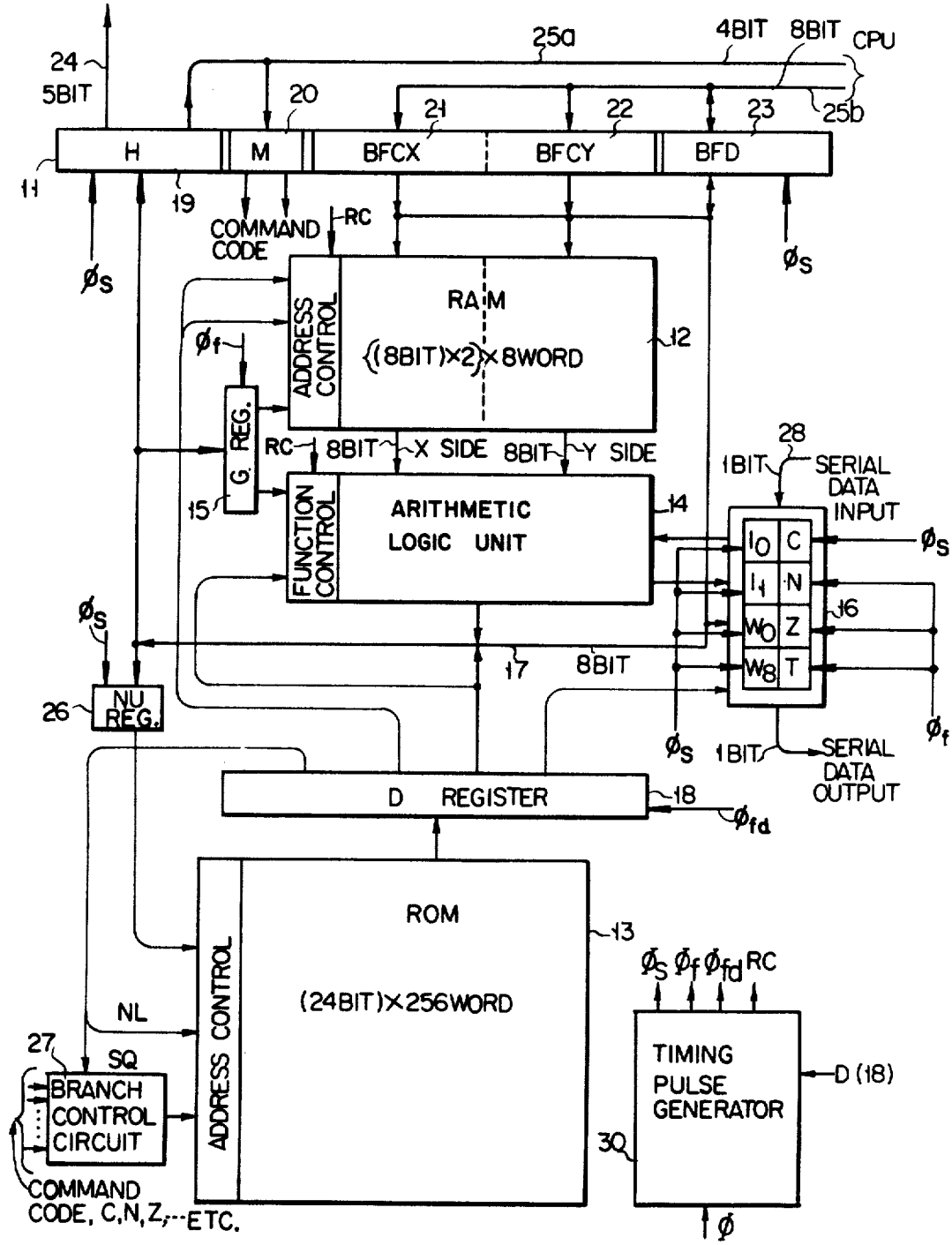
FIG. 1 is a block circuit diagram of a data processing system according to an embodiment of the invention.

FIG. 1 is a systematic block diagram showing a data processing system according to an embodiment of the invention.

Referring to FIG. 1, a data processing system of the invention comprises an input-output PORT (I/O PORT) 11 to receive a command and information from a not shown central processing unit (CPU) or a transfer data to be transferred to and from an input-output device, a Random Access Memory (RAM) 12 for storing therein a data from the I/O PORT 11 or the result of arithmetic operation or logic operation, an arithmetic logic unit 14 for arithmetically or logically calculating the information from the RAM, a Read Only Memory (ROM) 13 stored with a program instruction (or an instruction word) for regulating the execution of the operation of the data processing system, a functional register 15 stored with an instruction information read out from the ROM 13, to designate the address of the RAM 12 and the operation function of the arithmetic logic unit 14 in accordance with the information thus stored, and a group of working flip-flops 16 for holding the series input-output information of the arithmetic logic unit 14 or determining the conditions under which the data processing system operates. The above constitutent elements are connected to each other by means of an internal bus line 17 composed of eight bits. The data transfer between the I/O PORT 11 and the Random Access Memory (RAM) 12 is effected through that bus line 17.

Figure 4:
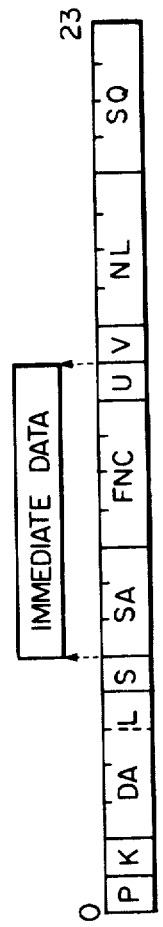
FIG. 4 shows a format of an instruction word being stored in the ROM shown in FIG. 1.

There will now be described further in detail the data processing device by reference to FIG. 1. The Memory 12 is a register composed of read/write memory cells into a matrix configuration, and is composed of 16 registers each comprised of eight bits. The content of two (X and Y sides) of those registers is read out in accordance with a command information read out from the ROM 13 or the content of the functional register 15, and is processed by the arithmetic logic unit 14. The 16-register memory RAM 12 has allocated thereto the addresses of X(0) to X(7) and Y(0) to Y(7) as in the address table of a register file shown in FIG. 2. The RAM 12 has stored therein a transfer data or the result of the arithmetic logic operation. This arithmetic logic unit 14 is a functionally combined circuit for executing various kinds of arithmetic operations or logical operations necessary to data processing. Further, the ROM 13 is stored with various instructions, for example, the microinstruction as shown in FIG. 4 and the instruction register 18 is stored, for each machine cycle, with the instruction read out from the ROM 13 which is situated at the address designated by a lower side address (NL) and an upper side address (NU). The instruction stored in the instruction register 18 controls the address selection of the RAM 12, the operation function of the arithmetic logic unit 14, the condition of specified ones of the group of working flip-flops 16, the address selection of the ROM 13, etc.

The I/O PORT 11 includes an H register 19, an M register 20, an X side buffer register (BFCX) 21, a Y side buffer register (BFCY) 22, and a buffer register (BFD) 23. The H register 19 is stored with information intended to communicate the condition of the data processing system through an external bus line 25a composed of 4-bit lines and with control bits for controlling an input-output medium (for example, magnetic disk or magnetic tape), and controls, in case of, for example, a magnetic disk control, the relative position between the disk and a magnetic head (arm). The H register 19 is allocated to the addresses Y(12), Y(13) in the address table of a register file shown in FIG. 2.

The M register 20 is a 4-bit register for storing therein the command information which is to be supplied from the CPU to the data processing system through the external bus line 25a, said command information being supplied to a branch control circuit as later described. The BFCX register 21 and BFCV register 22 are each a register stored with control information to be supplied from the CPU to the data processing system through an external bus line 25b composed of 8-bit lines, for example, a sector address or track address in the case of a magnetic disk control. The BFCX register 21 is allocated to the address X(10), X(11), while the BFCY register 22 to the addresses Y(10), Y(11) in the address table of the register file, respectively. The BFD register 23 is a buffer register for effecting data-link with the CPU. The information stored in this buffer register is transferred to the CPU through the external bus line 25b. The register 23 is allocated to the addresses Y(8), Y(9) in the address table shown in FIG. 2.

The functional register (G register) 15 constitutes a main characterizing part of the invention and is a register for designating the internal operation of the data processing system during a partial cycle as later described. The G register 15 is allocated to the addresses X(12), X(13) in the address table shown in FIG. 2. The functional register (G) 15 has stored therein the immediate data shown in FIG. 4 or the result of the arithmetic logic operation to designate the address of the RAM 12 and the operation function of the arithmetic logic unit 14.

An NU register 26 is a register composed of three bits. The ROM 13 has a capacity of 256 words. The address designation of the ROM 13 requires an address designation information composed of eight bits. Accordingly, the NU register 26 is a register for designating the upper-order three of the eight address-designation information bits. The NU register 26 is allocated to the addresses Y(14), Y(15) in the address table of the register file shown in FIG. 2.

It is to be noted that in the address table of the register file shown in FIG. 2, the registers allocated to the eighth "8" and the succeeding addresses are located at the input side of the arithmetic logic unit 14, but that this register location is an arrangement of logical construction and actually the register arrangement in the resulting circuit is different, as shown in FIG. 1, from that of FIG. 2, so that only the function of TH(X), TH(Y) as later described is made available for the arithmetic logic operation at the "8" address and the succeeding address.

Further, the command information of the M register 20 of the I/O PORT 11 is suppled to the branch control circuit 27 shown in FIG. 1. This circuit 27 functions, to designate this branch information and supply it to the lowermost significant bit of the 8-bit address intended to designate the address of the ROM 13. The branch control circuit 27 selects and designates, in accordance with an SQ field as later described, only one of the 16 items shown in Table 4 of the branch information which come from the M register 20, working flip-flops 16, . . . etc. Such 16 to 1 selector can be easily manufactured by using an ordinary technique.

The above-mentioned group of working flip-flops 16 is composed of flip-flops (C, N, Z, T, $I_0$, $I_1$, $W_0$, $W_8$) for use in converting or shifting the output of the arithmetic logic unit 14 from parallel data to serial data or temporarily holding a serial input data, as previously mentioned. The function of these flip-flops will be clear from the following explanation of command format. In the case of, for example, disk control, the working flip-flop group 16 receives the serial input data from the disk through a one-bit input line 28 and transmits serial output data to the disk through a one-bit output line 29. In this embodiment, the data processing system is formed on a single LSI chip.

Note that the respective constructions of said registers, memories, bus lines, working flip-flops are not limited to specified ones but can be modified into various forms by an ordinary technique.

Figure 3:
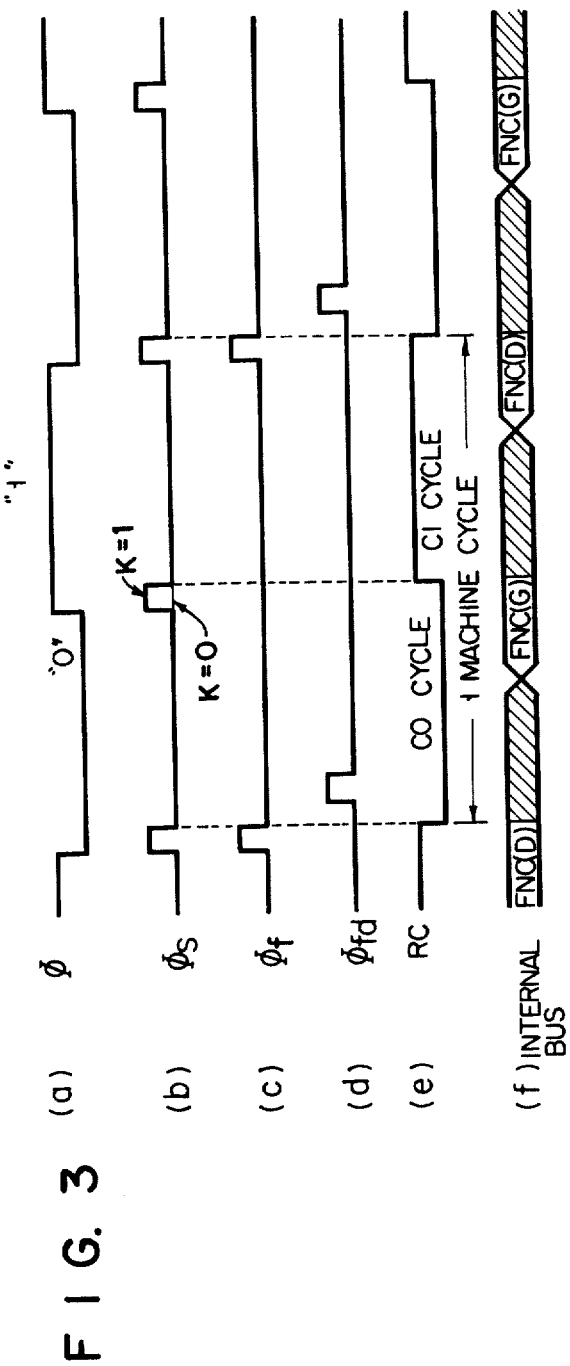
FIG. 3 is a time chart of the timing pulses generated from the timing pulse generator shown in FIG. 1.

The data processing system further includes a timing pulse generator 30, which receives, for example, a basic clock pulse $\phi$ from the CPU and generates timing pulses $\phi_s$, $\phi_f$, $\phi_{fd}$ and a discrimination signal RC having two partial cycles appearing during a single machine cycle. The timing with which the clock pulses $\phi_s$, $\phi_f$, $\phi_{fd}$ and discrimination signal RC are generated is controlled by the instruction stored in the D register 18. Namely as shown in FIG. 3(b), if "K" bit stored in the D register 18 has binary level of "0", the clock pulse $\phi_s$ comes to have "0" level during C0 cycle (hereinafter described). Thus, the results of the arithmetic logic operation carried out by the arithmetic logic unit 14 are prohibited from entering the register RAM 12. If "K" bit in the D register 18 has "1" level, the clock pulse $\phi_s$ comes to have "1" level. In this case the results of the arithmetic logic operation are allowed to enter the register RAM 12. The time chart of the respective timing pulse of the timing pulse generator is shown in FIG. 3. In the data processing system, the data processing operation is carried out by the action of the timing pulse. Namely, as shown in FIG. 3(a), when the basic clock pulse $\phi$ is applied to the timing pulse generator 30, the fall thereof causes generation of the timing pulses $\phi_s$, $\phi_f$. With the generation timing of the pulse $\phi_s$ shown in FIG. 3(b), the operation result supplied from the arithmetic logic unit 14 through the internal bus line is stored in the above-mentioned register file, and simultaneously the flip-flops C, $W_0$, $W_8$ of the working flip-flop group 16 are set. Further, the timing pulse $\phi_f$ showing in FIG. 3(e) sets the flip-flops N, Z, T of the working flip-flop group 16. The timing pulse $\phi_{fd}$ shown in FIG. 3(d) causes the instruction word read out from the ROM 13 to be stored in the D register 18. The discrimintion signal RC takes such a waveform as shown in FIG. 3(e). This signal RC indicates the said two partial cycles appearing during the single machine cycle. These timing pulses $\phi_s$, $\phi_f$ and $\phi_{fd}$ and the signal RC are applied to the above mentioned register shown in FIG. 1.

In the case of $RC=0$, the discrimination signal RC indicates the preceding one of said two partial cycles, and during this preceding partial cycle the data processing system is controlled only by the functional G register 15. Accordingly, this partial cycle is hereinafter referred to as "C0 cycle".

In the case of $RC=1$, the discrimination signal RC indicates the succeeding one of said two partial cycles of the single machine cycle, and during this succeeding partial cycle, the system is controlled only by the instruction word stored in the D register 18. Accordingly, this partial cycle is hereinafter referred to as "C1 cycle". Further, as shown in FIG. 3(f), an FNC (G) of the contents of the signal appearing on the internal bus line (17) indicates that the operation result designated by the G register 15 appears on that bus line 17. The operation result having appeared on this line 17 is set in the register file (Read/write memory 12) with the timing of $\overline{RC}\cdot\phi_s=1$. Similarly, an FNC(D) of the signal of FIG. 3(f) shows that the operation result designated by the instruction word stored in the D register 18 appears on the internal bus line 17. This operation result is set in the register file with the timing of $RC\cdot\phi_2=1$.

Note that in this embodiment said basic pulse $\phi$ functions as a strobe signal of the serial input data from thee disk with the timing of $\phi=1$. Generally, the length of the period during which $\phi=1$ varies with the interval between the bits of the input data bit, but since this is of no interest to the subject matter of the invention, explanation thereof is omitted.

The format of the instruction word stored in the ROM 13 is shown in FIG. 4. Referring to FIG. 4, this instruction word is composed of 24 bits, and is divided into eleven field units of logical function. Hereinafter, the function of the fields P, K, DA, L, S, SA, FNC, U, V, NL and SQ will be explained in turn.

(1) P(1 bit): this is a bit for designating the operation mode of each machine cycle. In the case of $P=0$, the readout of information from the register file and the write of information in the register file are effected only with respect to even addresses of the register file. Further, in the case of $P=1$, similarly, the readout of information from the register file and the write of information therein are effected only with respect to the odd addresses of the register file. The bit of the P field is used as the lowermost-order bit of the read-address/write-address of the register file. The designation of the P field effectively works on both of the operations performed during the C0 and C1 cycles. Further, as above stated, the registers allocated to the ninth address "9", and the succeeding, addresses of the register file addresses shown in FIG. 2 are allotted to both even addresses and odd addresses, and therefore under both of the $P=0$ mode and $P=1$ mode the register can be subject to access.

(2) K (1 bit): this is a bit for designating the operation mode of each machine cycle. In the case of $K=0$, the operations of the C0 cycle and C1 cycle are carried out in the order mentioned, while in the case of $K=1$ the operation of the C0 cycle is skipped and only the operation of the C1 cycle is conducted.

The fields of DA, L, S, SA, FNC and U function only relative to the C1 cycle.

(3) DA (3 bits), L (1 bit): each of these fields is a field for designating the address of one register of the register file for storing therein the data having appeared on the internal bus line 17 during the C1 cycle. The DA field is intended to designate the upper three order bits of a bit unit (4 bits) for designating the 0 to 15 addresses. The L field is intended to designate either one of the X side and Y side of the register file. The address constituted by the address designation bits of the DA and L is hereinafter referred to as "destination address". The location of those register addresses in the register file designated by the DA, L and P fields is shown in Table 1. Accordingly, as shown in Table 1, when it is desired to designate the address of, for example, the G register 15, this designation has only to be made such that $DA=110$, $L=0$, and $P=1$ or 0.

Table 1

| DA | P | L=0 | L=1 |
|---|---|---|---|
| 000 | 0 | X(0) | Y(0) |
| 000 | 1 | X(1) | Y(1) |
| 001 | 0 | X(2) | Y(2) |
| 001 | 1 | X(3) | Y(3) |
| 010 | 0 | X(4) | Y(4) |
| 010 | 1 | X(5) | Y(5) |
| 011 | 0 | X(6) | Y(6) |
| 011 | 1 | X(7) | Y(7) |
| 100 | 0 | X(8) | Y(8) |
| 100 | 1 | X(9) | Y(9) |
| 101 | 0 | X(10) | Y(10) |
| 101 | 1 | X(11) | Y(11) |
| 110 | 0 | X(12) | Y(12) |
| 110 | 1 | X(13) | Y(13) |
| 111 | 0 | X(14) | Y(14) |
| 111 | 1 | X(15) | Y(15) |

(4) SA (3 bit): this is a field for designating the register address of the register file used to perform the arithmetic operation during the C1 cycle, generally two registers (one register each from the X and Y sides with respect to the same address). The address constituted by the address designation bits of the SA field is hereinafter referred to as "source address". From this, the following will be understood. In the arithmetic logical operation, in the case where it is desired to obtain an exclusive logical sum of the addresses $X(i)$ and $Y(j)$, this sum can be obtained only when $i=j$ and not obtained when $i \neq j$. This SA field is constituted by the upper three order bits of the source address and, with one bit of the P field added thereto, designates the addresses of the register file. Table 2 shows the location of the register designated by the SA and P fields. It will be understood by way of comparison between Tables 1 and 2 that the address of the register file designated by the DA field is the same as that of the register file designated by the SA field.

Table 2

| SA | P | | |
|---|---|---|---|
| 000 | 0 | X(0) | Y(0) |
| 000 | 1 | X(1) | Y(1) |
| 001 | 0 | X(2) | Y(2) |
| 001 | 1 | X(3) | Y(3) |
| 010 | 0 | X(4) | Y(4) |
| 010 | 1 | X(5) | Y(5) |
| 011 | 0 | X(6) | Y(6) |
| 011 | 1 | X(7) | Y(7) |
| 100 | 0 | X(8) | Y(8) |
| 100 | 1 | X(9) | Y(9) |
| 101 | 0 | X(10) | Y(10) |
| 101 | 1 | X(11) | Y(11) |
| 110 | 0 | X(12) | Y(12) |
| 110 | 1 | X(13) | Y(13) |
| 111 | 0 | X(14) | Y(14) |
| 111 | 1 | X(15) | Y(15) |

(5) FNC (4 bits): this is a field for designating the type of the arithmetic logical operation carried out during the C1 cycle. From the functions (1) to (13) shown in Table 3 one functionis selected by the information content of this field. In Table 3, B0 to B7 represent eight bit-signals on the internal bus line 17, respectively, the B0 denoting the most signifficant bit, the B7 indicating the least significant bit. Further, X0 to X7 each represent the output of the X side of the register file. Similarly, Y0 to Y7 each represent the output of the Y side of the register file. Further, the flip-flps $I_0$, $I_1$, $W_0$, $W_8$, C and N form the working flip-flop group 16. Particularly, $I_0$ and $I_1$ are the flip-flops provided for storing therein the serial input data from the input device (disk). The reason why two flip-flops are provided for such purpose is that, generally, the transfer data has its single bit cell composed of two data bits; and it is necessary to store these two bit data pieces separately. For example, in the case of the magnetic disk, a frequency modulation write-in system is used, and in this system each bit cell is composed of two data bits "clock bit" and "data bit". The storing of data into $I_0$ flip-flop is effected with the timing $\phi=1$ of the machine cycle under the mode of $P=1$, while the storing of data into the $I_1$ flip-flop is effected with the timing $\phi=1$ of the machine cycle under the mode of $P=0$.

The TH of the items (1), (2) in Table 3 is a passing function and is intended to pass or hand the information of the register file subject to address designation onto the internal bus line. The SK of the item (3) is a skew function and is intended to rearrange the each bit position into reverse order. The SFI of the items (4), (5) is a shift function and is intended to cause a take-in, through the bus line 17, of the information stored in the working flip-flop group 16. With respect to the $I_0$ flip-flop, this function is performed during the machine cycle under the mode of $P=0$, while with respect to the $I_1$ flip-flop, this function is performed during the machine cycle under the mode of $P=1$. This is represented in the form of $\bar{P} \cdot I_0 + P \cdot I_1 \rightarrow B_7$ in Table 3.

The SFC of the items (6), (7) is a shift function and is intended to pass or hand the information stored in the C flip-flop into the bus line 17. The X ∀ Y of the item (8) is an operation function and is intended to calculate the EXCLUSIVE OR. The X#Y, X$Y of the items (9), (10) are a logical operation function and are used to check, at the time of data reception, a cyclic redundancy check code added to the transfer data and simultaneously to form, at the time of transmission, a cyclic redundancy check code to be added to the transfer data. The X+1, Y−1, X-Y of the items (11), (12), (13) are an arithmetic addition-subtraction function.

fields of SA, FNC and U do not function. And those contents of the instruction words which are represented by the 8 bits contained in the SA, FNC and U fields are outputted as so-called "immediate data" onto the internal bus line 17 as shown in FIG. 4.

(8) V (1 bit): this is a bit for designating the operation of that T flip-flop of the working flip-flop group 16 which corresponds to the serial output data appearing on the serial data output line 29 of FIG. 1 during the Cl cycle.

When $V=1$, there is performed the operation for setting or moving the content of the N flip-flop to the T flip-flop with the pulse timing of $\phi_f = 1$. When $V=0$, there is carried out the operation for setting "1" to the T flip-flop with the pulse timing of $\phi_f = 1$.

(9) NL (4 bits): this is a field for designating some bits of the address information of the ROM having stored thereon, the instruction words with which to execute the processing operation of this system during the next machine cycle, and this field, as it stands, comes to be an Table 3

| Notation | Function |
| --- | --- |
| (1) TH(X) | $X_k \rightarrow B_k$ (k= 0 to 7) |
| (2) TH(Y) | $Y_k \rightarrow B_k$ (k= 0 to 7) |
| (3) SK(Y) | $Y_{7-k} \rightarrow B_k$ (k= 0 to 7) |
| (4) SFI(X) | $\bar{P} \cdot I_0 + P \cdot I_1 \rightarrow B_7$; $X_{k+1} \rightarrow B_k$ (k= 0 to 6); $X_0 \rightarrow C$ |
| (5) SFI(Y) | $\bar{P} \cdot I_0 + P \cdot I_1 \rightarrow B_7$; $Y_{k+1} \rightarrow B_k$ (k= 0 to 6); $Y_0 \rightarrow C$ |
| (6) SFC(X) | $C \rightarrow B_7$; $X_{k+1} \rightarrow B_k$ (k = 0 to 6); $X_0 \rightarrow C$ |
| (7) SFC(Y) | $C \rightarrow B_7$; $Y_{k+1} \rightarrow B_k$ (k = 0 to 6); $Y_0 \rightarrow C$ |
| (8) X ∀ Y | $X_k \oplus Y_k \rightarrow B_k$ (k = 0 to 7) (Exclusive OR) |
| (9) (10) X#Y, X$Y | $\overline{CRI} \rightarrow B_7$; where $P=1$: $(X_{k+1} \oplus Y_{k+1}) \cdot CRI + Y_{k+1} \cdot \overline{CRI} \rightarrow B_k$ (k=0 to 6); $(X_0 \oplus Y_0) \cdot CRI + Y_0 \cdot \overline{CRI} \rightarrow W_1$; $W_1 \rightarrow B_7$; where $P=0$: $(X_{k+1} \oplus Y_{k+1}) \cdot CRI_{k+1} \cdot \overline{CRI} \rightarrow B_k$ (k=0 to 6); $B_0 \rightarrow W_0$; then CRI = $I_1 \oplus W_0$ (X#Y); $N \oplus W_0$ (X$Y) |
| (11) Y + 1 | (Y) PLUS 1 → $B_{0 \text{ to } 7}$ (Arithmetic addition) |
| (12) Y − 1 | (Y) MINUS 1 → $B_{0 \text{ to } 7}$ (Arithmetic subtraction) |
| (13) X − Y | (X) MINUS (Y) → $B_{0 \text{ to } 7}$ (Arithmetic subtraction) |

(6) U (1 bit): this is a bit for designating the operation of the N flip-flop of the working flip-flop group 16. In the case of $U=1$, the value of the said $B_0$ is stored in the N flip-flop with the clock pulse timing of $\phi_f = 1$, while in the case of $U=0$ the data content stored in the N flip-flop is subject to no change and the previous data content remains unchanged.

(7) S (1 bit): this is a bit for regulating the operation of the Cl cycle. In the case of $S=0$, the operation result of the operation circuit 14 is outputted onto the internal bus line 17, the field group composed of 8 bits in all, that is, the fields of SA, FNC and U in the above items (4) to (6) perform their respective said functions. In the case of $S=1$, the operation result of the operation circuit 14 is not outputted onto the internal bus line 17 and the address bit unit composed of four bits succeeding to the three bits of the address designated by the information of the above-mentioned NU register 26.

(10) SQ (4 bits): this is a field for designating the lowermost order bit of the address of the ROM having stored therein the instruction words with which to execute the operation during the next machine cycle. This field plays the role of adding to the lowermost order bit of a ROM-designating address a signal for causing this lowermost order bit to perform the branch operation shown in Table 4. That is to say, one conditional branch signal corresponding to the information indicated by the four bits of the SQ field is selected from 16 branch information pieces in Table 4.

Table 4

| | Notation | | Function | |
| --- | --- | --- | --- | --- |
| (1) | | Unconditional branch | 0 → | The lowermost order address bit of ROM 13 |
| (2) | | | 1 → | " |
| (3) | $M_0=1$ | | $M_0 \rightarrow$ | " |
| (4) | $M_1=1$ | (Note 1) | $M_1 \rightarrow$ | " |
| (5) | $M_2=1$ | | $M_2 \rightarrow$ | " |
| (6) | $M_3=1$ | | $M_3 \rightarrow$ | " |
| (7) | $C=1$ | | $C \rightarrow$ | " |

Table 4-continued

| Notation | | Function | | |
|---|---|---|---|---|
| (8) | N=1 | | | N → |
| (9) | Z=1 | Conditional | (Note 2) | Z → |
| (10) | TND=1 | branch | (Note 3) | TND→ |
| (11) | BSY=1 | | (Note 4) | BSY→ |
| (12) | IX=1 | | | IX → |
| (13) | $S_0=1$ | | | $S_0$ → |
| (14) | $S_1=1$ | | (Note 5) | $S_1$ → |
| (15) | $S_2=1$ | | | $S_2$ → |
| (16) | $S_3=1$ | | | $S_3$ → |

(all function arrows followed by " ditto ")

In Table 4, there are shown branch information pieces, (1) to (16) and their respective functions. In Table 4, a (Note 1) indicates an output signal of the said M register 20. A (Note 2) denotes one of the working flip-flop group 16, the one-bit register being altered, for each machine cycle (C1 cycle), with the information conerning whether or not the information contents of the internal bus line 17 composed of eight bits are all a logical level of "0".

$$\pi_{k=0}^{7} \bar{B}_k = \overline{\sum_{k=0}^{7} B_k} \to Z \text{ (when } \phi_f = 1)$$

A (Note 3) indicates a "data-transfer interruption denoting signal" being transmitted from the CPU. A (Note 4) indicates a flip-flop being set each time the CPU writes a new piece of command information into the M register 20. A (Note 5) represents a signal denoting the condition infomation of an input-output medium which is communicated from an input-output medium control device. Note that the type of the branch conditions in Table 4 can not course be modified variously.

Next, explanation will be made of the G register 15 as an internally functional register. This register is a one for controlling the operation of the system during the C0 cycle as previously mentioned. The bit composition or configuration of this register 15 is presented in FIG. 5. The bits 0 to 2 of the G register ($G_0$ to $G_2$) are used to designate both said "source address" and "destination address" during the C0 cyle. Namely, in this embodinent, the "source address" and "destination address" in the C0 cycle should be identical. The bits $G_3$ to $G_6$ are intended to designate the arithmetic and logical operation function during the $C_0$ cycle. The address of either the X or Y side of the register file as a destination address is designated by the bit $G_7$ of the G register. In Table 5, there is shown the register file location of both the "source address" and "destination address" to be designated by the $G_0$, $G_1$, $G_2$, $G_7$ and the above-mentioned P field bit. As shown in Table 5, the register location of the register file corresponding to the address being designated by the four bits ($G_0$, $G_1$, $G_2$ and P) is shown allocation thereto.

Table 5

| $G_0$ | $G_1$ | $G_2$ | P | Source | | Destination | |
|---|---|---|---|---|---|---|---|
| | | | | | | $G_7=0$ | $G_7=1$ |
| 0 | 0 | 0 | 0 | X(0), | Y(0) | X(0) | Y(0) |
| 0 | 0 | 0 | 1 | X(1), | Y(1) | X(1) | Y(1) |
| 0 | 0 | 1 | 0 | X(2), | Y(2) | X(2) | Y(2) |
| 0 | 0 | 1 | 1 | X(3), | Y(3) | X(3) | Y(3) |
| 0 | 1 | 0 | 0 | X(4), | Y(4) | X(4) | Y(4) |
| 0 | 1 | 0 | 1 | X(5), | Y(5) | X(5) | Y(5) |
| 0 | 1 | 1 | 0 | X(6), | Y(6) | X(6) | Y(6) |
| 0 | 1 | 1 | 1 | X(7), | Y(7) | X(7) | Y(7) |
| 1 | 0 | 0 | 0 | X(8), | Y(8) | X(8) | Y(8) |
| 1 | 0 | 0 | 1 | X(9), | Y(9) | X(9) | Y(9) |
| 1 | 0 | 1 | 0 | X(10), | Y(10) | X(10) | Y(10) |
| 1 | 0 | 1 | 1 | X(11), | Y(11) | X(11) | Y(11) |
| 1 | 1 | 0 | 0 | X(12), | Y(12) | X(12) | Y(12) |

Table 5-continued

| $G_0$ | $G_1$ | $G_2$ | P | Source | | Destination | |
|---|---|---|---|---|---|---|---|
| | | | | | | $G_7=0$ | $G_7=1$ |
| 1 | 1 | 0 | 1 | X(13), | Y(13) | X(13) | Y(13) |
| 1 | 1 | 1 | 0 | X(14), | Y(14) | X(14) | Y(14) |
| 1 | 1 | 1 | 1 | X(15), | Y(15) | X(15) | Y(15) |

From the foregoing description the followings have been made clear.

Figure 6:
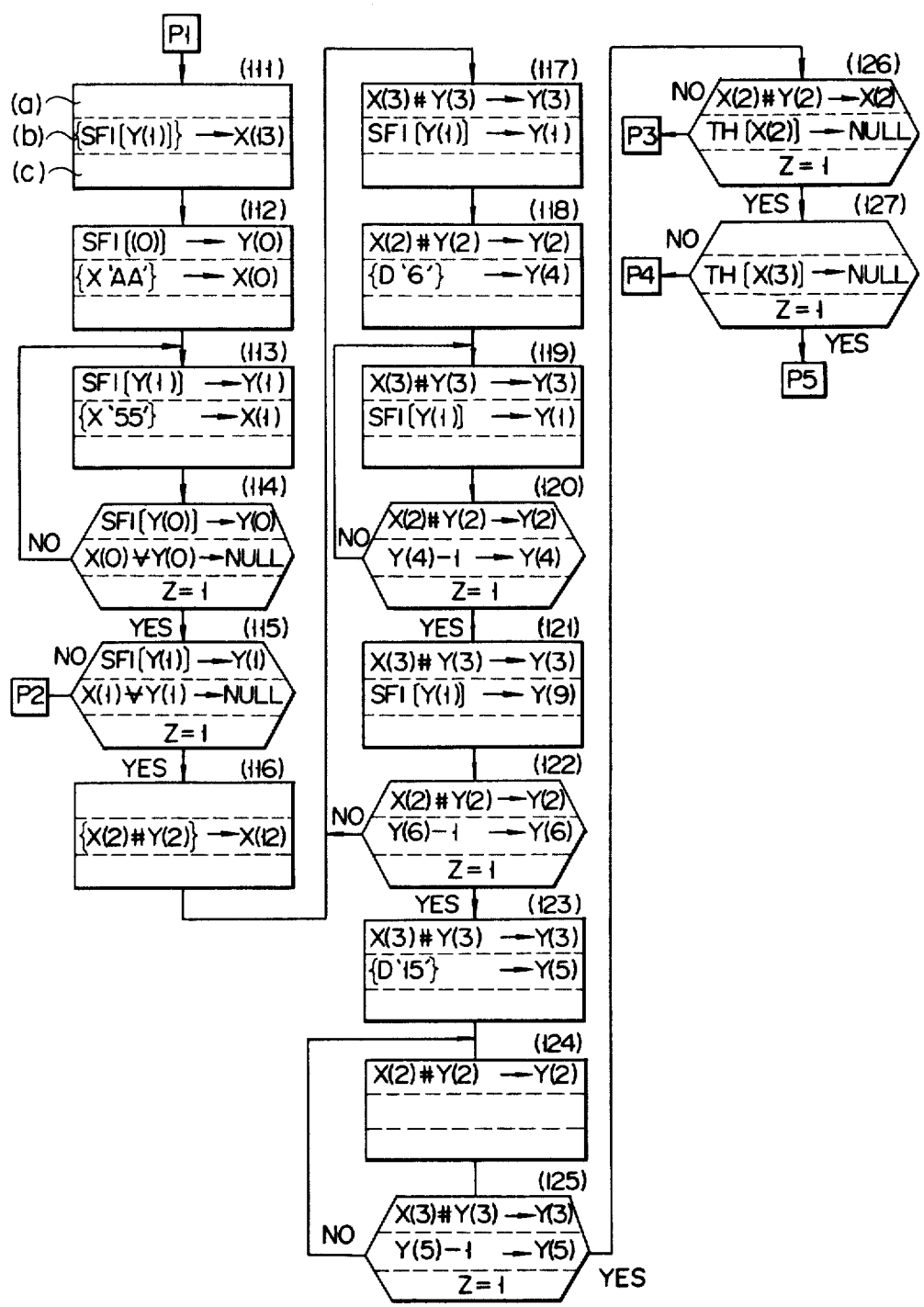
FIG. 6 shows an example of a data processing operation flow chart of the system of the invention and this flow chart is a one obtained when the data block written in desired format has been processed by the system.

(a) The "source address" of the register file, during the C0 cycle, is designated by the bits $G_0$, $G_1$ and $G_2$ of the functional G register 15 and the P field (bit) and, during the C1 cycle, is designated by the SA field and P field as shown in FIG. 6.

Figure 2:
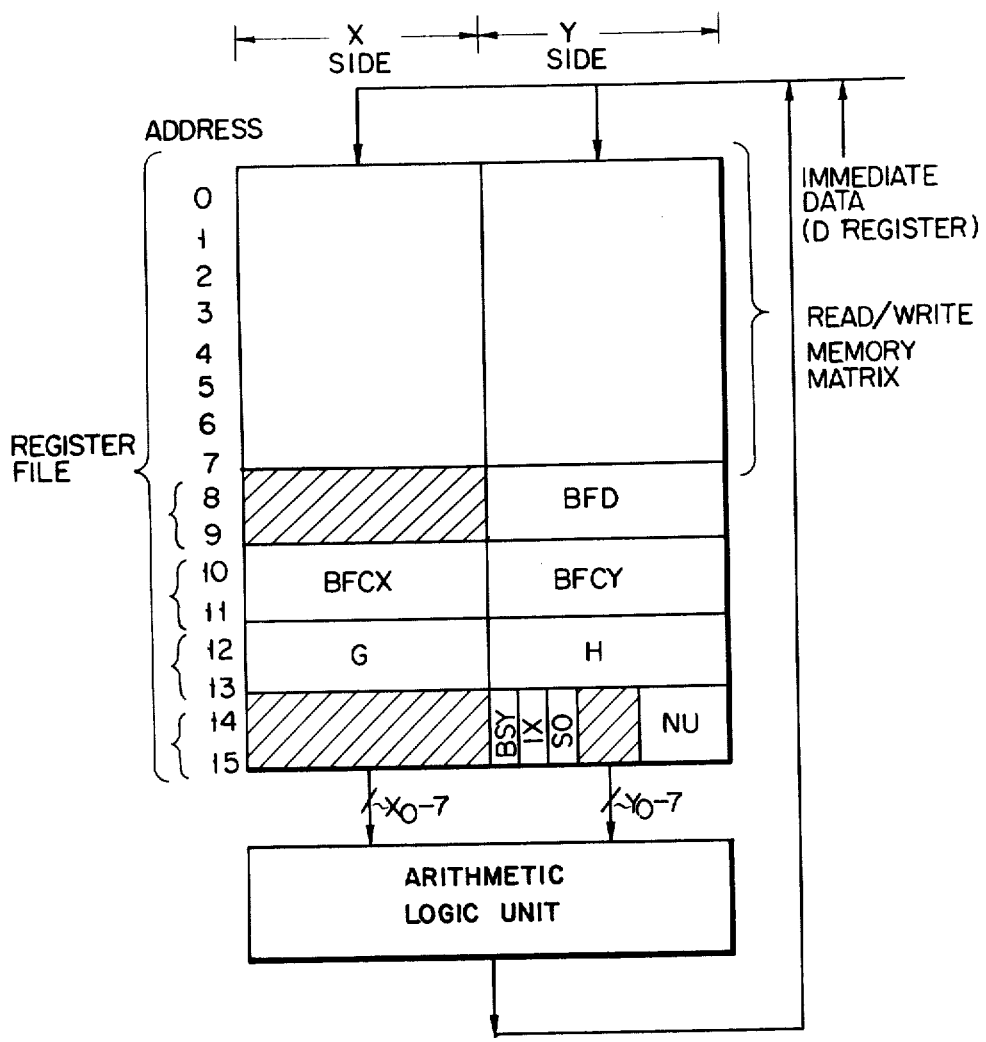
FIG. 2 shows a register file of the invention and in more detail the arrangement of registers addressed in the file, it being to be noted that this Figure shows the register file by way of address arrangement but, actually, the respective registers are located in different places.

The "source address" applied to the register file of FIG. 2 is represented by a general formula with the above taken into consideration. Assume now that the "source address" selection signal composed of 4-bit being applied to the register file, in consideration of the circuit of the system, be again represented in the unit of bit from the upper order digit toward the lower by $SRC_0$, $SRC_1$, $SRC_2$ and $SRC_3$. Then, these are expressed by the following formula.

$$\begin{aligned} SRC_0 &= \overline{RC} \cdot G_0 + RC \cdot SA_0 \\ SRC_1 &= \overline{RC} \cdot G_1 + RC \cdot SA_1 \\ SRC_2 &= \overline{RC} \cdot G_2 + RC \cdot SA_2 \\ SRC_3 &= P \end{aligned} \quad (1)$$

In the formula (1), the RC represents a signal for discriminating between the above-mentioned partial cycles $C_0$ and $C_1$ and the $SA_0$ to $SA_2$ represent the SA field in the unit of bit from the upper order digit toward the lower.

(b) The destination address, during the C0 cycle, is designated by the bits $G_0$, $G_1$ and $G_2$ of the functional G register and the P field and, during the C1 cycle, is designated by the DA field and P field as shown in Table 1.

Assume now that, as in the case of the source address, the "destination address" selection signal composed of 4-bit being applied to the register file in consideration of the circuit of the system, be again represented by $DST_0 DST_1$, $DST_2$ and $DST_3$. Then, these are expressed by the following formula.

$$\begin{aligned} DST_0 &= \overline{RC} \cdot G_0 + RC \cdot DA_0 \\ DST_1 &= \overline{RC} \cdot G_1 + RC \cdot DA_1 \\ DST_2 &= \overline{RC} \cdot G_2 + RC \cdot DA_2 \\ DST_3 &= P \end{aligned} \quad (2)$$

(c) The X and Y sides selection bit forming part of the "destination address", during the C0 cycle, is designated by the bit $G_7$ of the functional G register 15 and, during the C1 cycle, is designated by the L field.

When it is now assumed that, similarly to the above, J represents again the X and Y sides selection bit being applied to the register file, then J will be expressed as follows.

$$J = \overline{RC} \cdot G_7 + RC \cdot L \tag{3}$$

(d) The four bits $G_3$ to $G_6$ of the functional register 15 designate the arithmetic and logical operation function used during the C0 cycle, and the way of this designation is quite the same as the way of designating the operation function by the FNC field during the C1 cycle. Namely, the 4-bit code corresponding to each of the functions (1) to (3) shown in Table 3 has only to be written-in the four bits $G_3$ to $G_6$ of the functional register 15.

When it is now assumed that the function selection signal composed of 4-bit being applied to the operation circuit be again represented by $GNC_0$ to $GNC_3$, in consideration of logical circuit, then, the $GNC_0$ to $GNC_3$ will be expressed by the following logical formula.

$$\left.\begin{array}{l} GNC_0 = \overline{RC} \cdot G_3 + RC \cdot FNC_0 \\ GNC_1 = \overline{RC} \cdot G_4 + RC \cdot FNC_1 \\ GNC_2 = \overline{RC} \cdot G_5 + RC \cdot FNC_2 \\ GNC_3 = \overline{RC} \cdot G_6 + RC \cdot FNC_3 \end{array}\right\} \tag{4}$$

The description made in the foregoing items (a) to (d) is of great importance in terms of hardware of the data processing system according to the invention. Particularly, the above-enumetrated logical formulas (1) to (4) are a subject matter from the standpoint of hardware technique of the system according to the invention. Namely, the only hardware structure peculiar to the invention is the functional register 15 and a selector circuit represented by the logical formulas (1) to (4).

Note that in this embodiment a single machine cycle is divided into two partial cycles, but that the single machine cycle can generally be divided into n partial cycles. In this case, it is necessary to provide the functional register in number of $(n-1)$.

The hardware structure of the data processing system according to the invention has above been explained in detail. Hereinafter, a detailed operation of the system will be explained in accordance with the processing flow shown in FIG. 6. This process flow is an example of loading a specific 8-bit leading mark and a data block composed of 128 bytes succeeding to the leading mark, both the leading mark and the data block being previously written in a magnetic disk, and transferring them into a central processor. Prior to a detailed description of the processing flow of FIG. 6, the particulars associated with the processing flow will first be explained. In FIG. 6, the processing functions used during the single machine cycle of the data processing system are received in a single square or hexagonal "box". The "box" has a description of statement covering three lines, and the description content of each line is as follows.

(a) The first line: the processing function used during the C0 cycle is described in this line in the form of the following equation (5)

$$\alpha \rightarrow \beta \tag{5}$$

where $\alpha$ represents the function of the operation circuit and $\beta$ represents one register of the register file which is situated in the location designated by the bits $G_0$ to $G_2$ and $G_7$ of the functional G register. Note that when the K field of the instruction word shown in FIG. 4 is a logical level of 1, namely when the C0 cycle is skipped, the first line (a) is blank.

(b) The second line: the processing function used during the C1 cycle is described. First, where $S=0$, this function is described in this line in the same form as in the first line (a), namely, in the form of the above equation (5). Where $S=1$, the function is described in the form of the following equation (6)

$$\{\gamma\} \rightarrow \beta \tag{6}$$

where $\gamma$ repesents the immediate data pattern shown in FIG. 4. Note that where the word "null" is written in the position $\beta$, it indicates that no operation result is to be set into any register. The address (for example, an address represented by $DA_0=1$, $DA_1=1$, $DA_2=1$ and $L=0$, shown in oblique lines of FIG. 2) of the register making the operation of the system actually ineffective corresponds to that numeric value represented by the bits $DA_0$ to $DA_2$ of the DA field and the L field bit which corresponds to said word "null".

(c) The third line: where the above-mentioned conditional branch is effected, branch function is described in this line in accordance with the notation shown in Table 4.

FIG. 7 relates to a data format of the magnetic disk, and FIG. 7A shows the composition of a single bit cell written in the magnetic disk. The bit cell consists of a clock bit and a data bit succeeding to the clock bit, and the clock bits, except for a lead mark, each have written therein a logical level of "1". FIG. 7B shows the composition of the lead mark. The lead mark is composed of eight bit-cells. The clock bits have logical levels of 1, 0, 1, 0, 1, 0, 1, 0 from the foremost bit toward the rearmost, respectively. The data bits have logical levels of 0, 1, 0, 1, 0, 1, 0, 1 from the foremost bit toward the rearmost, respectively. In FIG. 7C, there is shown the composition of a data block. Namely, the data block is sandwiched between two synchronous regions in each of which logical levels of "0" are written (in the synchronous region the clock bits each having a logical level of "1"), and is composed of a leading mark of 1 byte, a data of 128 bytes and a cylcic redundancy check code of 2 bytes.

The registers used in the operation flow of FIG. 6 have their respective destination or roles shown in Table 6 below.

Table 6

| Register | Role |
|---|---|
| X(0) | Lead mark pattern storing register (clock bit) |
| Y(0) | Clock-bit loading buffer register |
| X(1) | Lead mark pattern storing register (data bit) |
| Y(1) | Data-bit loading buffer register |
| X(2), X(3) | The register for storing therein the functional formula of cyclic redundancy check code-producing multinominal expression |
| Y(2), Y(3) | Cyclic redundancy check operation register |
| Y(4), Y(5) | Bit counter |
| Y(6) | Word counter (byte counter) |

In the operation flow chart example of FIG. 6, the machine cycle under the mode of $P=0$ and the machine cycle under the mode of $P=1$ are alternately executed, and the former machine cycle is used for the loading of clock bits, while the latter is used for the loading of data bits. Assume now that the address of X(2) and X(3) of the register file has stored therein the functional formula of cyclic redundancy check code-producing multinominal expression and the address of Y(6) has written therein a decimal numeric value of 128. Then, where said multinominal expression is $X^{16}+$writen therein a value of "00100000"12+$X^{15}$+1, the location (2) has written therein a value of "00000100", while the location X(3) has written therein a value of "00100000". ($X^{16}$) represents the uppermost order digit bit of the register file).

The stpes of the processing flow shown in Table 6 will now be explained in detail with the particulars associated with Table 6 taken into account.

Step 111: This is a write-in step for making it possible to perform, during the C0 cycle, in the step 112 and the succeeding steps, the functions represented by the formula $$\left. \begin{array}{l} SFI[Y(0)] \rightarrow Y(0) \, (P = 0) \\ SFI[Y(1)] \rightarrow Y(1) \, (P = 1) \end{array} \right\} \quad (7)$$

In this step, the instruction word read out from the ROM 13 is written in the the functional register 15 represented by the location X(13) (in this case field $S=1$). This formula (7) is intended to perform the operation of loading and storing the clock bit from the disk into the register of the address Y(O) and loading and storing the data bit into the register of the address Y(O).

Step 112: In the step 112 to 116 the function of the formula (7) is carried out during the C0 cycle. A hexadecimal "AA" value (a clock-bit pattern of leading mark), during the C1 cycle, is read out from the ROM 12 and written, as the immediate data pattern shown in FIG. 4, into the register corresponding to the address X(O) of the memory 12 ($S=1$).

Step 113: In this step, the data bist loaded in accordance with the formula (7), during the C0 cycle, is read out from the disk and stored into the register corresponding to the address Y(1) of the memory 12 through the working flip-flop 16 and the internal bus line 17. During the C1 cycle, a hexadecimal "55" value (a data-bit pattern of leading mark) is written, as the immediate data pattern, into the register corresponding to the address X(1) of the memory 12 ($S=1$).

Step 114: In this step, during the C0 cycle, the clock bits are loaded into the register corresponding to the address Y(0) of the memory 12 in accordance with the formula (7). During the C1 cycle, it is judged whether or not the content stored in the address Y(0) of the memory 12 is identical to the content stored in the address X(0). Where this judgement result indicates that both are identical, the processing operation is advanced to the next step 115, where both have been judged to be unidentical, the processing operationis backed to the preceding step 113 and the loading of data from the disk is repeatedly carried out.

Step 115: The data bits are loaded during the C0 cycle from the disk into the address Y(1) of the memory 12 in accordance with the formula (7). During the C1 cycle, it is judged whether or not the data content stored in the address Y(1) is identical to the data content stored in the address X(1). Where this judgement result indicates that both are identical, it means that the existence of a leading mark has been confirmed by both the clock bit and data bit and the processing operation is advanced to the next step 116. Where both the content of the address Y(1) and the content of the address X(1) have been judged to be unidentical, the processing operation is carried into the operation flow $P_2$ and the processing data is processed therein as a format error.

Step 116: In this step, for purpose of causing the following functions to be performed during the C0 cycle in the step 117 and the succeeding steps, an instruction word is read out from the ROM 13 and written into the address of the functional register 15 corresponding to the location X(12).

$$\left. \begin{array}{l} X(3) \, \# \, Y(3) \rightarrow Y(3) \, (P = 1) \\ X(2) \, \# \, Y(2) \rightarrow Y(2) \, (P = 0) \end{array} \right\} \quad (8)$$

The function represented by the formula (8) is intended to perform the cyclic redundancy check and, as shown in Table 6, carries out the arithmetic and logical operation of a functional expression being stored in the addresses X(2) and X(3) to cause the resulting check code to be stored in the registers of the addresses Y(2) and Y(3).

Step 117: In this step, during the C0 cycle, a cyclic redundancy check is performed in accordance with the formula (8). During the C1 cycle, the data bit is loaded from the disk into the address Y(1) of the memory 12.

Step 118: In this step, during the C0 cycle, the cyclic redundancy check is performed in accordance with the formula (8). During the C1 cycle, an initially set numeric value "6" is written from the ROM 13 into the register, acting as a bit counter, corresponding to the address Y(4) of the memory 12 ($S=1$).

Step 119: This step performs the same operation as in the case of the step 117.

Step 120: In this step, during the C0 cycle, the cyclic redundancy check is conducted in accordance with the formula (8). During the C1 cycle, a numeric value 1 is subtracted from the register content of the address Y(4) having stored therein said numeric bit-counting value and it is judged whether or not the subtraction result is zero. Where, this judgment result is zero, the processing operation is advanced to the next step 121, and where it is not zero, the processing operation is backed to the step 119 and the same processing is repeatedly carried out.

Step 121: In this step, during the C0 cycle, the cyclic redundancy check is performed in accordance with the formula (8). During the C1 cycle, the loading of data bits is usually effected from the disk to the system. In this step, however, the loading of byte unit is completed and therefore the loaded result is written into the BFD register 23 at the location Y(9) of the register file in order to be transferred into the CPU.

Step 122: In this step, during the C0 cycle, a numeric value 1 is subtracted from the data content of the register located at the address Y(6) and used as a byte counter, and it is judged whether or not the subtraction result is zero. Where this result has been judged to be zero, the processing operation is advanced to the next step 123, and where that result is not zero, the processing operation is backed to the step 117 and the same processing is repeatedly performed.

Step 123: In this step, during the C0 cycle, the cyclic redundancy check is performed in accordance with the formula (8). During the C1 cycle, the decimal numeric value "15" is written into the register, acting as a bit counter, corresponding to the address Y(5) of the memory 12. In this step, the loading of only the data shown in FIG. 7C is already finished and therefore the loading operation as shown in the previously mentioned step 117 is not carried out.

Step 124: In this step, the cyclic redundancy check is performed in accordance with the formula (8). During the C1 cycle, no processing operation is executed.

Step 125: In this step, during the C0 cycle, the cyclic redundancy check is carried out in accordance with the formula (8). During the C1 cycle, a numeric value "1" is subtracted from that register of the address Y(5) which is stored with a bit counting value, and it is judged whether or not the subtraction result is zero. As a result of judgment, where the subtraction result is zero, the processing operation is advanced to the next step 126 and where this result is not zero, the processing operation is backed to the preceding step 124.

Step 126: In this step, during the C0 cycle, the cyclic redundancy check is performed in accordance with the formula (8). In this step, the processing operation according to the formula (8) is completed. During the C1 cycle, it is judged whether or not the final result (finally produced code) of the cyclic redundancy check, which is stored in the address Y(2) of the memory 12, is zero. As a result of judgment, where this final result is zero, the processing operation is advanced to the next step 127 and where that result is not zero, the processing data is carried into the operation flow $P_3$ and is processed therein as an erroneous transfer error. In the flow $P_3$, the redundancy check code -producing multinominal expression therefore stored in the address X(2) is made ineffective.

Step 127: In this step, during the C0 cycle, nothing is processed. During the C1 cycle (in this case field $K=1$), it is judged whether or not the final result of the cyclic redundancy check stored in the address Y(3) of the memory 12 is zero. As a result of judgment, where this final result is zero, the processing operation enters the operation flow $P_5$ and is processed as a correct transfer data, and where that result is not zero, the processing data is carried into the operation flow $P_4$ and is processed therein as an erroneous transfer data. Note that the above-mentioned reference notations $P_1$ to $P_5$ have no particular meaning and may be considered simply as a tag.

According to the flow chart of FIG. 6, the use of the steps 112 to 116 produce the same extent of effect as that attainable with the provision of independent shift register and the use of the steps 117 to 126 produces the same extent of effect as that obtainable with the provision of an independent cyclic redundancy check circuit.

The data processing system of the invention, with attention paid to the fact that the function demanded as a data processing system is mainly intended to perform a stationary data processing operation, is designed to enable the functional register to execute high functions by taking advantage of that fact. Accordingly, the data processing system of the invention is of the hardware structure which has flexibility as of an architecture and necessitates no random-characteristics as of a circuit and is capable of being integrated on a small scale and needs no high-speed characteristics as of a logical element, and as a result can be constructed on a single LSI chip as a data processing system.

The preceding embodiment referred to the case where the data processing system was applied mainly to the magnetic disk control, but this invention can of course be applied to other types of control such as a magnetic tape control, communication terminal control, etc. The data processing system of the invention prominently exhibits its effect particularly in the case where two or more types of processing flows (background job and foreground job) are necessary.

Further, through providing the data processing system with a program counter, it can be designed to perform the data processing while monitoring the instructions stored in the ROM 13. Further, the data processing system may have the said NU register omitted therefrom and be constructed so that the address bit being stored in the NU register is added to the lower order bit unit or NL bit unit. Further, the data processing system may be more flexible in terms of the register controlled by the P field, i.e., the address register of the register file which has any designated order of odd or even number. Further, the data processing system of the invention may be so designed as to cause an increase in the working area (capacity) of the memory 12.

This invention is not restricted to the above-mentioned embodiments and various changes and modifications can be made without departing from the spirit and scope of this invention.

What is claimed is:

1. A data procesing system for processing data arithmetically and transferring the processed data between an input/output unit and a central processing unit, the data processing system having a cycle control function and comprising:
   a register file consisting of registers each to be addressed and being adapted to store transfer data and the results of an arithmetic logic operation;
   an arithmetic logic unit for arithmetically processing particular data read out from the register file;
   memory means for storing instruction words;
   instruction register means for storing an instruction word read out from the memory means during each machine cycle to designate an arithmetic logic operation to be carried out by the arithmetic logic unit;
   at least one functional register addressed in the registr file and connected to the instruction register means to designate an arithmetic logic operation to be carried out by the arithmetic logic unit; and
   signal generating means for generating a pulse representing the timing at which data are to be stored in each register addressed in the register file and a signal representing one of at least two partial cycles forming the machine cycle,
   whereby during one partial cycle an arithmetic logic operation is carried out based on the contents of the functional register means in response to a signal which represents the partial cycle and during the other partial cycle an arithmetic logic operation is carried out based on instruction register means in response to a signal which represents the other partial cycle.

2. A data procesing system according to claim 1 wherein the arithmetic logic operation performed in the one partial cycle is carried out again in the other partial cycle of each machine cycle.

3. A data processing system according to claim 1 wherein the arithmetic logic operation is carried out during the one partial cycle of each machine cycle in accordance with an instruction word read out from the memory means during the immediately preceding machine cycle.

* * * * *